(12) United States Patent
Gupta et al.

(10) Patent No.: US 7,941,797 B2
(45) Date of Patent: May 10, 2011

(54) DYNAMICALLY PROVIDING NATIVE LIBRARIES AND THEIR DEPENDENCIES

(75) Inventors: Nikhil Gupta, Cedar Park, TX (US); Jeffrey M. Achtermann, Austin, TX (US); Brian G. Vassberg, Austin, TX (US); Bryan R. Moore, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 1476 days.

(21) Appl. No.: 11/260,576

(22) Filed: Oct. 27, 2005

(65) Prior Publication Data

US 2007/0169110 A1    Jul. 19, 2007

(51) Int. Cl.
G06F 9/44    (2006.01)

(52) U.S. Cl. .................. 717/170; 717/169; 717/173

(58) Field of Classification Search ........... 717/168–178
See application file for complete search history.

(56) References Cited

U.S. PATENT DOCUMENTS

| | | | |
|---|---|---|---|
| 4,970,639 A | 11/1990 | Diefendorf et al. | |
| 6,006,034 A * | 12/1999 | Heath et al. | 717/170 |
| 6,272,677 B1 | 8/2001 | Lam et al. | |
| 6,381,742 B2 * | 4/2002 | Forbes et al. | 717/176 |
| 7,222,341 B2 * | 5/2007 | Forbes et al. | 717/176 |
| 7,281,047 B2 | 10/2007 | Hayko et al. | |
| 7,523,116 B2 | 4/2009 | Yan | |
| 2003/0093508 A1 | 5/2003 | Li et al. | |
| 2007/0169025 A1 * | 7/2007 | Moore et al. | 717/139 |

OTHER PUBLICATIONS

Kim, Steven. "Java Web Start." Sep. 1, 2001, IBM developerWorks. Retrieved from http://www.ibm.com/developerworks/java/library/j-webstart/ on Sep. 24, 2009.*
Sun Microsystems, Inc. "Java™ Network Launching Protocol & API Specification (JSR-56)." May 21, 2001. Sun Microsystems, Inc. pp. 1-85. Retrieved from http://java.sun.com/javase/technologies/desktop/javawebstart/download-spec.html on Apr. 9, 2010.*
Kim, Steven. "Java Web Start", Sep. 1, 2001, IBM developerWorks, Retrieved from http://www.ibm.com/developerworks/java/library/j-webstart/ on Sep. 24, 2009, 15 pages.
U.S. Appl. No. 11/333,451, Image File Wrapper printed on Apr. 14, 2010, 2 pages.
Office Action mailed Nov. 8, 2010 for U.S. Appl. No. 11/333,451; 18 pages.
Response to Office Action filed Jan. 27, 2011, U.S. Appl. No. 11/333,451, 22 pages.

* cited by examiner

*Primary Examiner* — Michael J Yigdall
*Assistant Examiner* — Erika Kretzmer
(74) *Attorney, Agent, or Firm* — Francis Lammes; Stephen J. Walder, Jr.; Jeffrey S. LaBaw

(57) ABSTRACT

A mechanism is provided for providing a native code library from a server to an application written in an interpreted programming language for execution on a remote computer. An installer object is invoked from within a main class of the interpreted programming language application. The install object extracts a file list from the server including at least one native code library filename indicating a native code library. The native code library indicated by the native code library filename is installed to a target directory on the remote computer and the main class of the interpreted programming language application is then invoked on the remote computer. Additional native code library dependencies are also installed to the target directory on the remote computer.

12 Claims, 4 Drawing Sheets

DYNAMICALLY PROVIDING NATIVE LIBRARIES AND THEIR DEPENDENCIES

FIELD OF THE INVENTION

The present invention relates to data processing systems and to the processes of downloading, updating and running applications written in interpreted programming languages on data processing systems. In particular, the present invention provides a method, program and system for updating and installing a native code library and its dependencies to an appropriate location for use by applications written in interpreted programming languages such as Java, REXX, BASIC, SmallTalk, Python and Perl.

BACKGROUND OF THE INVENTION

Programs written in an interpreted programming language may be executed by a programming virtual machine. In interpreted languages, rather than generating native machine code, a compiler generates byte-codes to be used by the programming virtual machine. These byte-codes provide the control and data necessary to execute an application. Subsequently, to actually execute an interpreted programming language application, an interpreter interprets the compiled byte-codes generated by the compiler. Theoretically, any programming language may be interpreted; however the term "interpreted programming language" traditionally designates languages that are implemented through execution by an interpreter. The term "interpreted programming language" also designates languages for which no compilers are written.

A well-known interpreted programming language is Java, which will be used herein as a preferred example. However, it should be well understood to those skilled in the art that other interpreted programming languages, such as REXX, BASIC, SmallTalk, Python, Perl and the like are within the scope of this invention.

Java is a software programming language, originally developed by Sun Microsystems, that is designed to generate applications that can run on all hardware platforms without modification. Because of this, Java applications have found extensive use on the World Wide Web (WWW). Java applications can be called from within hypertext markup language (HTML) documents or launched stand alone.

As is known to those skilled in the art, a WWW server may include facilities for storing and transmitting application programs, such as application programs written in Java, for execution on a remote computer.

The Java Virtual Machine (JVM) is a virtual computer component that resides only in memory on the remote computer. For a Java application to be executed on different types of data processing systems, a compiler typically generates an architecture-neutral file format so that the compiled code is executable on any processor, so long as the JVM is accessible by the processor. The architecture-neutral file format consists of bytecode instructions that are generated by a Java compiler and are non-specific to a given computer architecture. A bytecode is a machine independent code generated by the Java compiler and executed by a Java interpreter. A Java interpreter, part of the JVM, alternately decodes and interprets an intermediary code called "bytecode". These bytecode instructions are designed to be easily interpreted on any platform and easily translated into native machine code.

Java Web Start (JWS) provides a mechanism to run Java applications without installing anything on the remote computer except the JVM and JWS. Generally, JWS simply downloads the Java application jar files from the server whenever the Java application is launched on the remote computer. This takes advantage of the Java code's machine-independence to easily update the Java application when it is launched the next time on the remote computer.

However Java Applications often use native code, for example, code written in C or C++ programming language that is specific to a particular platform or operating system. Java applications access the native codes provided by these native methods using the Java Native Interface (JNI). Typically these native methods are provided as dynamically loaded libraries (or DLLs) to the JNI. A native method DLL is usually not portable across different operating platforms.

When Java applications use JNI and have dependency on a DLL that has dependencies on other DLLs, the JWS encounters certain limitations in launching the Java application. For example, if the Java application has any JNI code with dependencies on other libraries, the application will not start if the libraries are not in the path of the Java Runtime Environment (JRE). This applies to any main Java application but also to JWS itself (e.g. if there is any JNI code with dependencies on other libraries, JWS will also not start). JWS can load the JNI library only if the library does not have any other dependencies or if the dependencies are already installed where the JVM can locate them.

JWS does not allow the loading of the JNI library from the webstart cache even if they are available in the cache. For example, the main Java application has JNI code in the library a.dll, which has dependencies on the libraries b.dll and c.dll. JWS cannot load b.dll and c.dll even if they are in the same jar file as a.dll. For JWS to work, libraries b.dll and c.dll need to be installed in an existing directory that is already in the path of the JRE.

In such a situation, Java Web Start launches the application but the application fails to start. To circumvent this situation, an external installer program, such as InstallShield, must then be run on the remote computer. The remote computer is then connected to the server and receives the dependent libraries for installation. The Java application is then re-started. If there are updates to the libraries at the next launch of the application, they must also be manually installed.

It would be desirable therefore to provide a mechanism to install and update native code libraries and their dependencies that does not require an external installer. It would further be desirable to provide a mechanism to install and update native code libraries and their dependencies for the use of applications written in interpreted programming languages.

More particularly, it would be desirable to provide a mechanism to install and update the JNI libraries and their dependencies that does not require an external installer. It would further be desirable to provide a mechanism to install the dependencies in the JRE path using JWS as well as a mechanism for the JNI to easily update its dependencies.

The present invention provides a method and system for dynamically installing and updating such native code libraries and their dependencies from the server in order to overcome the objections described above.

SUMMARY OF THE INVENTION

The method of the present invention provides a native code library from a server to an interpreted programming language application for execution on a remote computer. An installer object is invoked from within a main class of the interpreted programming language application. A file list is extracted from the server including at least one library filename designating a native code library. The native code library indicated by the library filename is installed to a target bin directory on the remote computer and the main class of the interpreted programming language application is then invoked on the remote computer. Additional native code library dependencies are also installed to the target bin directory on the remote computer. The method extracts a latest version file from the server, locates a current version file in the target bin directory on the remote computer and compares the version numbers in the current version file and the latest version file to determine which files to install on the remote computer. The method also overwrites a current version file in the target bin directory with the latest version file as well as overwriting older native code library files present on the remote computer with the latest version of the native code library file and its dependencies.

The aforementioned and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

The present invention implements a data processing system and method for managing the installation of native code libraries and their dependencies used in applications developed using an interpreted programming language, such as Java, REXX, BASIC, SmallTalk, Python, Perl and the like. In such languages, instructions are compiled into byte-codes to be used by a virtual machine but some native code (particularly libraries and their dependencies) is also used.

In the following description, numerous specific details are set forth to provide a thorough understanding of the present invention. However, it will be obvious to those skilled in the art that the present invention may be practiced without such specific details. In other instances, well-known devices have been shown in block diagram form in order not to obscure the present invention in unnecessary detail.

Figure 1:
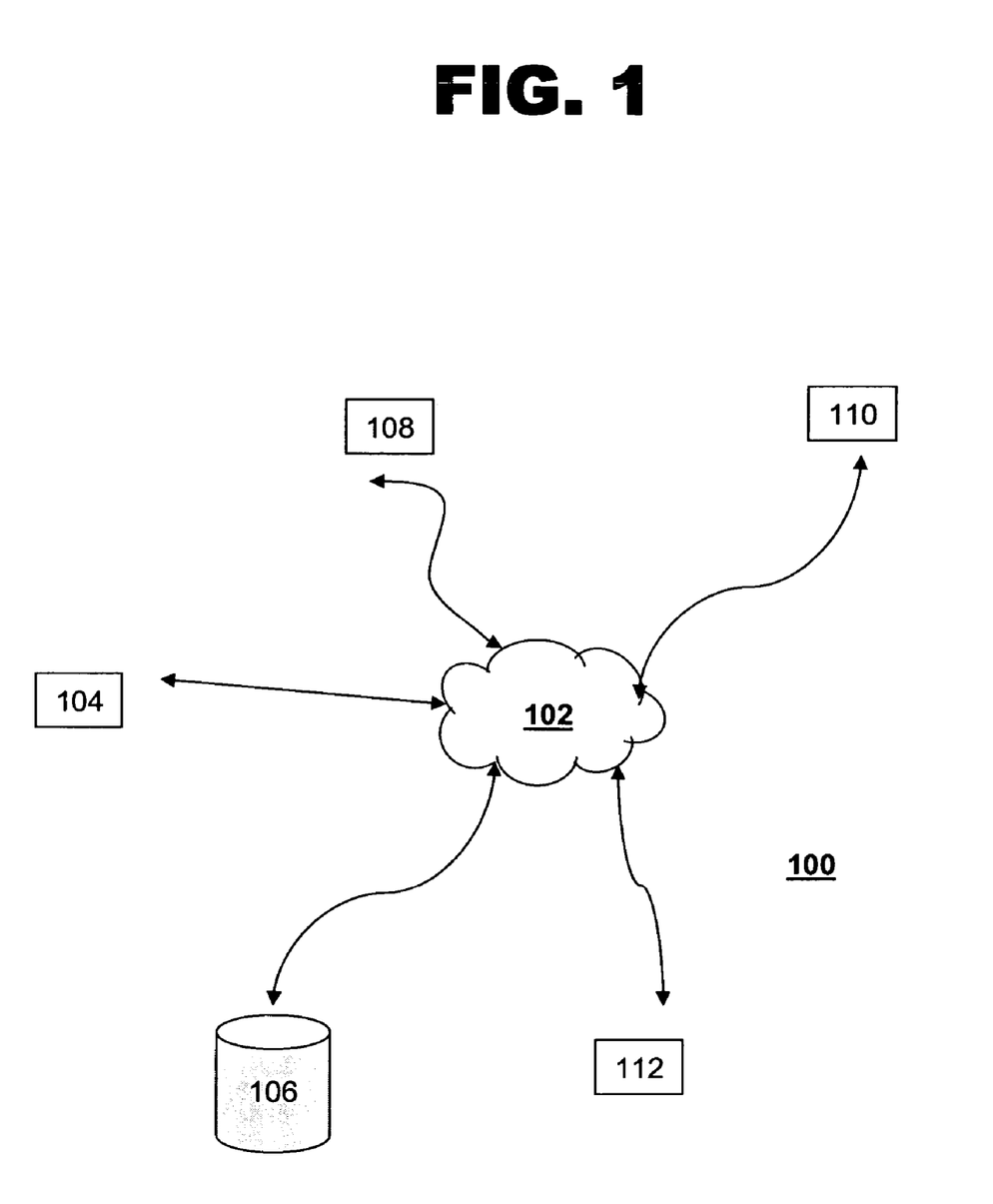
FIG. 1 is a block diagram of a network of data processing systems in which the present invention may be implemented.

FIG. 1 is a pictorial representation of one embodiment of distributed data processing system in which the present invention is implemented. Distributed data processing system 100 comprises a network 102, which is the medium used to provide communications links between various devices and computers connected together within distributed data processing system 100. Network 102 may include permanent connections, such as wire or fiber optic cables, or temporary connections made through telephone connections. The various processes that comprise the present invention may reside on the same host machine or on different machines interconnected over network 102. (e.g., the Internet, an intranet, a wide area network (WAN) or local area network (LAN)). Thus, machines benefiting from the present invention have appropriate networking hardware to establish a connection to one or more other machines (server and/or remote computer). For example, machines connected to network 102 may have a TCP/IP or NETBIOS connection to a network running over a token ring or Ethernet adapter.

A server 104 is connected to network 102 as described above, along with storage unit 106. Server 104 provides data such as Server 104 provides data, such as Java applications, JNIs, libraries and other programs to remote computers 108, 110, 112. Such data may be stored on storage unit 106 and accessed by server 104.

In an illustrative embodiment of the present invention, the central server 104 may utilize a Web-based software system, such as Sun Microsystems's Java Web Start that enables the central server 104 to distribute and update appropriate Java applications, JNI libraries and their dependencies via a WWW connection.

Remote computers 108, 110, and 112 are also connected to network 102. Remote computers 108, 110, and 112 may be, for example, personal computers or network computers, having a variety of processors and operating systems.

Distributed data processing system 100 may include additional servers, clients, and other devices not shown. FIG. 1 is intended as an example, and not as an architectural limitation for the processes of the present invention.

Figure 2:
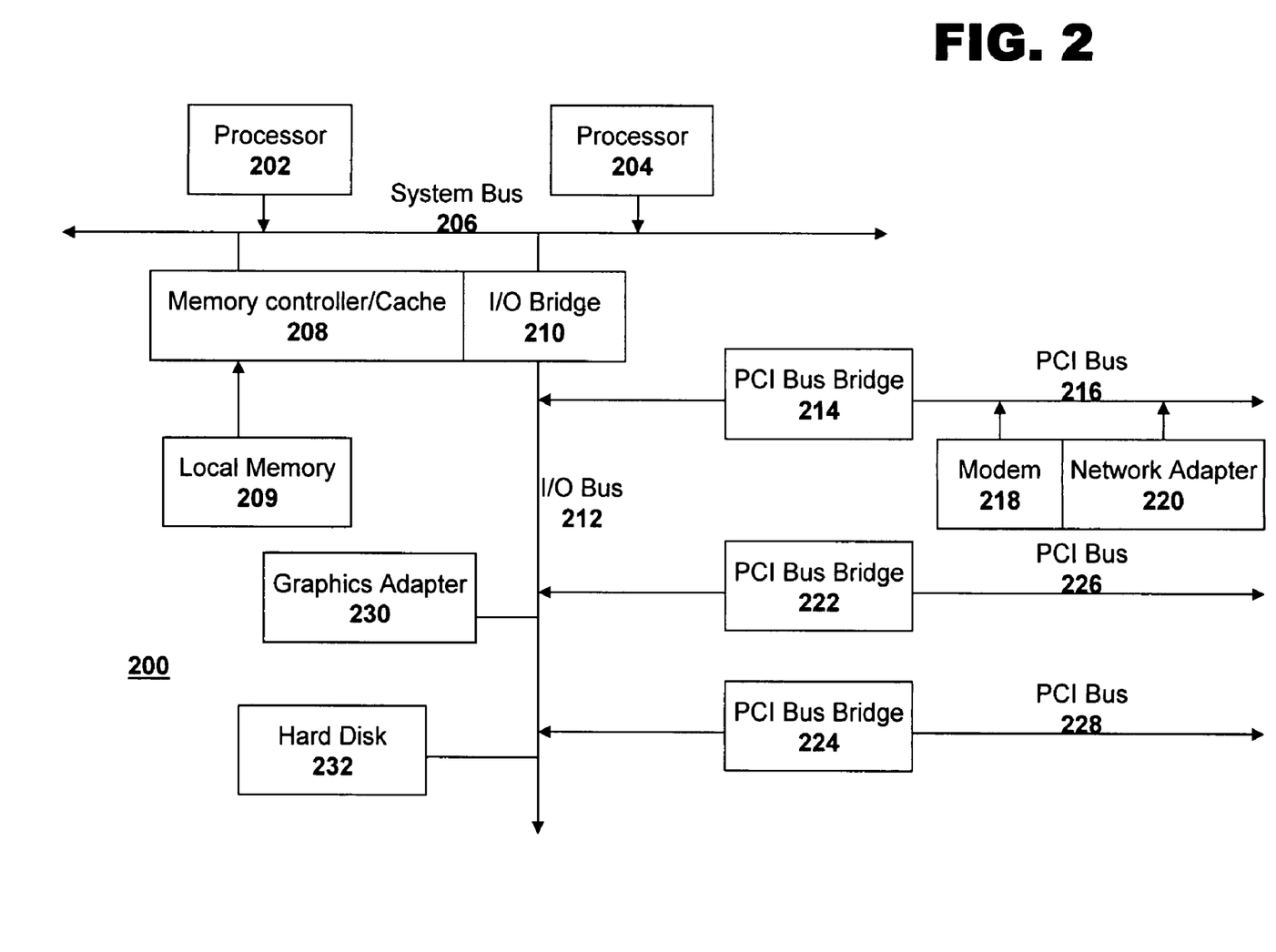
FIG. 2 is a block diagram of a data processing system that may be implemented as a server in accordance with a preferred embodiment of the present invention.

FIG. 2 is a block diagram of a data processing system that may be implemented as a server, such as server 104 in FIG. 1. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The data processing system depicted in FIG. 2 may be, for example, an IBM eServer pSeries, a product of International Business Machines Corporation in Armonk, N.Y., running the Advanced Interactive Executive (AIX) operating system. FIG. 2 is not meant to imply architectural limitations with respect to the present invention.

In one embodiment of the invention, native code libraries and a file listing the filenames of these native code libraries are packaged in a jar file, called, for example "install.jar" on server 104. Another file containing a version number is also packaged in the same jar file on server 104. The installer object invoked at the remote computer 108, 110, 112 extracts the file containing the list of native code libraries from the server 104. Versions of these same files are inside the install-.jar file. Therefore, install.jar file contains the following:

a file called, for example "version.txt", which gives the version number of the jar file;

a file called, for example "filelist.txt", which gives the list of files needed to run the main interpreted programming language application; and all the files listed in "filelist.txt"

This installer object goes through the list of the name and extracts each one of the files from the "install.jar" file to a desired bin directory on the remote computer.

Figure 3:
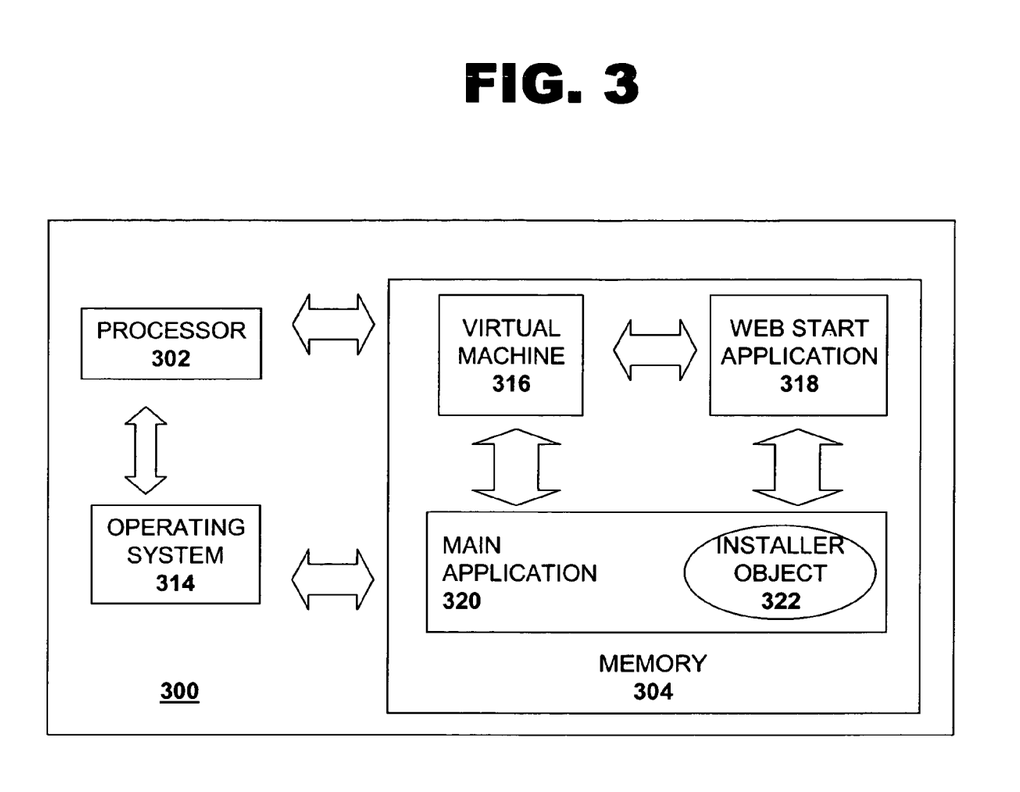
FIG. 3 is a block diagram illustrating a data processing system in which the present invention may be implemented.

FIG. 3 is a block diagram of a data processing system that may be implemented as a remote computer, such as computers 108, 110, 112. One or more of the processes that update or install native code libraries and their dependencies may be carried out on such a remote computer, or on one or more such computers connected via a computer network. In an illustrative embodiment, the updating or installation of Java Native Interface libraries and their dependencies to be used by a Java application are carried out on such a remote computer, or on one or more computers connected via a computer network.

In addition to other components, the data processing system 300 of FIG. 3 comprises processor 302, main memory 304, operating system 314, a virtual machine interpreter 316, a web start application 318, and one or more main application programs 320 as well at least one installer object 322.

Operating system 314 runs on processor 302 and is used to coordinate and provide control of various components within data processing system 300 in FIG. 3. The operating system may be a commercially available operating system, such as Windows XP, which is available from Microsoft Corporation. One or more programming systems may run in conjunction with the operation system 314, such as interpreted programming languages including but not limited to Java, REXX, BASIC, SmallTalk, Python, Perl and the like. An object-oriented programming system such as Java may run in conjunction with the operating system and provide calls to the operating system from Java programs or applications executing on data processing system 300, ("Java" is a trademark of Sun Microsystems, Inc.). Instructions for the operating system, the object-oriented programming system, and applications or programs are located on storage devices, such as hard disk drives and may be loaded into main memory 304 for execution by processor 302.

Virtual Machine (VM) 316 is an abstract computing machine that includes an instruction set and uses various memory areas within memory 304. VM 316 is loaded or stored, for example, in main memory 304 for execution by processor 302. VM 316 is any suitable virtual machine capable of interpreting one or more interpreted programming languages in order to provide data or control of a desired program to operating system 314.

In an illustrative embodiment, Sun Microsystems Java 2 Platform, Standard Edition (J2SE) emulates the VM on various platforms. Further details about the Java Virtual Machine in particular may be obtained in The Java™ Virtual Machine Specification, Tim Lindholm and Frank Yellin, Addison Wesley (1997), ISBN 0-201-63452-X, which is incorporated herein by reference. Any suitable Java virtual machine interpreter may also be used.

Figure 4:
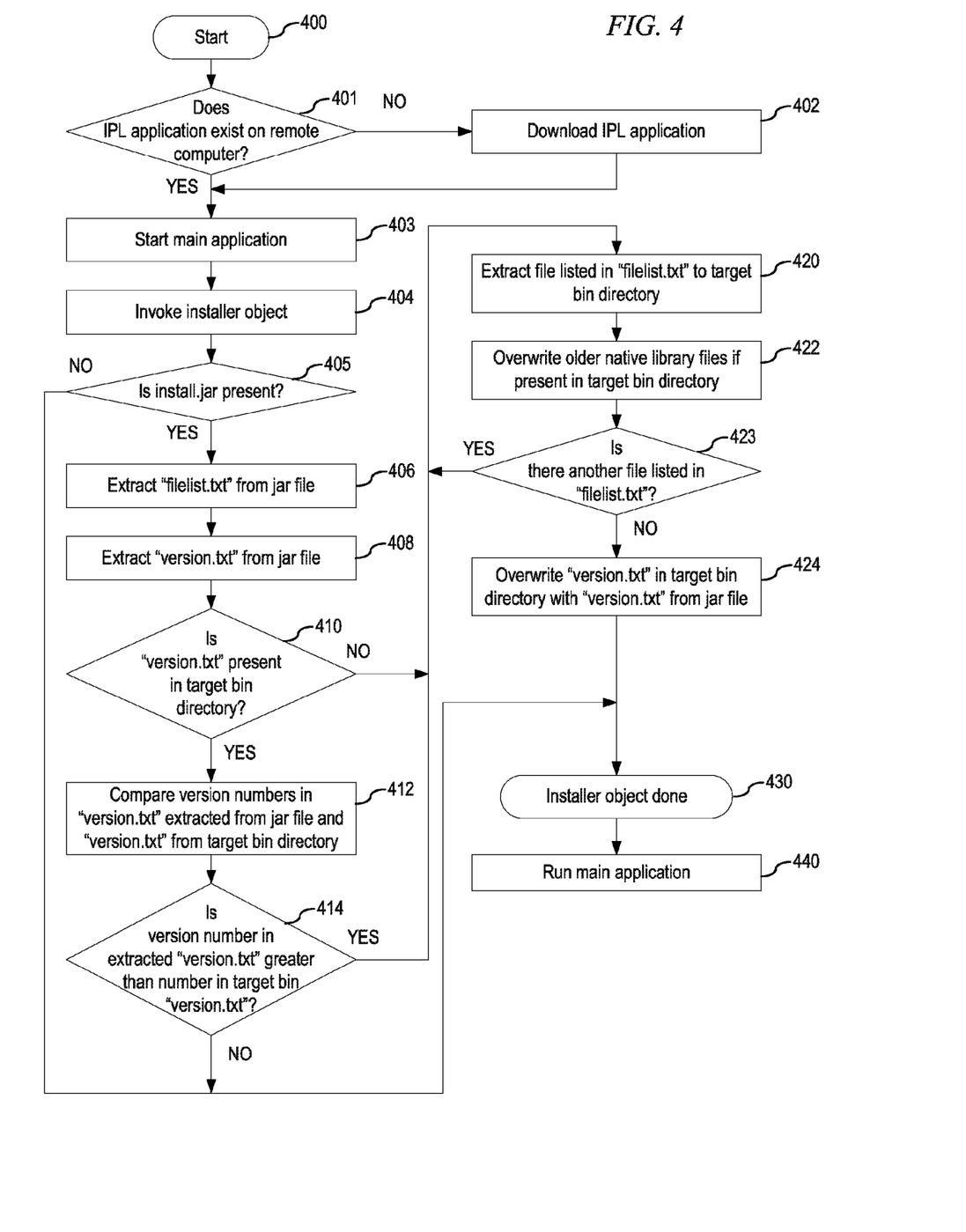
FIG. 4 illustrates a method of dynamically providing native code libraries to interpretive programming language applications, in accordance with one embodiment of the current invention.

Web Start application (WSA) 318 is a Web-based software system that enables a server 104 to distribute and update desired interpreted programming language applications, native code libraries and dependencies via a WWW connection with remote computers 108, 110, 112 as described further in FIG. 4. WSA 318 is loaded or stored, for example, in main memory 304 for execution by processor 302. WSA 318 is used to launch interpreted programming language applications on remote computers 108, 110, 112. Typically, these applications are launched in a dedicated platform or runtime environment, which contains core executables, core files, supporting files and any other data needed to launch the desired application.

In an illustrative embodiment, WSA 318 is Java Web Start, which is a Web-based software system that enables a server 104 to launch desired Java applications on one or more remote computers, to install and update JNI libraries and their dependencies and to provide other required data for execution of Java applications to remote computers via a WWW connection. For example, WSA 318 updates application jar files or, in accordance with the present invention, places required native code interfaces in a target directory. WSA 318 is a part of or in communication with VM 316.

Thus, in this illustrative example, the Java Runtime Environment (JRE) includes the Java Web Start application, Java Virtual Machine, core executables, core files and support files to create a standard Java platform. The JRE is therefore generally already present on remote computer 108, 110, 112 by the time Java Web Start is run. JWS 318 serves to update application jar files. For example, when a user first accesses a Java application, the JWS software will download all the needed files for the application, as well as download the JRE if the requested version is not available locally.

Main application 320 is a Web-based software system that enables a server 104 to execute desired application functions and process data related to these application functions on a remote computer 108, 110, 112 via a WWW connection. Typically, main application 320 is launched in a dedicated platform or runtime environment, which can access executables, supporting files and any other data needed to run the desired application 320. Although FIG. 3 shows only one main application, the method of the present invention is suitable for use with a plurality of desired applications. Main application 320 is a part of or in communication with VM 316 and may be launched by WSA 318. In an illustrative embodiment, main application 320 is any desired Java application, many of which are well known in the art.

Installer object 322 is a software bundle of variables and related methods that are used to execute the steps of the present invention as detailed in FIG. 4. Installer object is invoked by remote computer 108, 110, 112 or more precisely by main application 320. The installer object is able, for example, to determine the absence or presence of certain files, to determine the versions of these files that are on the remote computer, to determine the versions of the files it downloaded from the server and to overwrite certain files if the versions it downloaded are newer or the files are not present at all on the remote computer.

For example the installer object comprises computer program code which tries to find the install.jar file in the list of downloaded files on the remote computer. The installer object also comprises computer program code that enables the extraction of specific native code libraries from the install jar file. The installer object also comprises computer program code that is able to place extracted libraries into a target bin directory. The installer object also comprises computer program code that invokes the native code libraries from the server and loads them onto the remote computer. The installer object is typically packaged with the other jar files for the main application and can be invoked from within the main class of the application itself.

In an illustrative embodiment, Java Web Start connects to the URL on the server 104 that has been indicated by remote computer 108, 110, 112. While JWS is running the main application class 320, the installer object 322 is also being invoked by the main application class 320 and the installer object executes the method of the present invention as described further below.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may also be used in addition to or in place of the hardware depicted in FIG. 3. Also, the processes of the present invention may be applied to a multiprocessor data processing system.

Thus, for example, remote computer 108, 110, 112 is any personal computer or workstation platform that is Intel-, PowerPC- or RISC-based, and that includes an operating system such as IBM OS/2, Microsoft Windows XP, Microsoft Windows NT 4.0, Unix, AIX 5SL or the like. A representative computer runs an Intel x86 processor, the OS/2 Warp Version 3 operating system, JVM Version 1.1.1 and Java Web Start 1.04. Alternatively, the computer runs an x86 processor, the Windows XP (or Windows NT) operating system, JVM version is 1.4 and above. Generally the JWS version is also 1.4 and above, based on the version of the JVM it is packaged with.

FIG. 3 is not meant to imply architectural limitations. For example, data processing system 300 also may be a notebook computer, hand held computer or Personal Digital Assistant. Data processing system 300 also may be a kiosk or a Web appliance.

FIG. 4 is a flow diagram of one method 400 of dynamically providing native code libraries and their dependencies to an interpreted programming language application, in accordance with the present invention. The method of the present invention can be accomplished by a computer program product accessible from a computer-usable or computer-readable medium providing program code for use by or in connection with a computer or any instruction execution system, such as, for example, Java Web Start.

Native code libraries are typically files used by an interpreted programming language application that are written in native code (often C or C++). Such native code libraries are specific to a particular platform rather than being architecture-independent. Generally, these libraries are dynamically loaded, meaning that they are loaded at times other than during the startup of the application. That is, they are not loaded until needed by the application. Furthermore, these libraries are often dependent on other libraries. That is, a first library (e.g., a.dll) may be loaded and then, as it is loaded, may require one or more other libraries (e.g., b.dll and/or c.dll, etc.)

DLLs are particularly useful for implementing plug-in or modules, because they are not loaded until needed. These libraries are also available for a wide variety of uses. For example, the Pluggable Authentication Modules (PAM) system uses DL libraries to permit administrators to configure and reconfigure authentication. DLLs may be used to implement interpreters for occasionally compiling code into machine code, e.g., in implementing a just-in-time (JIT) compiler or multi-user dungeon (MUD).

DLLs are also accessible using a variety of interfaces including Linux, Solaris, AWT and the aforementioned Java Native Interface (JNI). Although the JNI serves as an illustrative example, the method of the present invention may be used by any equivalent interface to provide any desired native code library, any dynamically loaded library and any desired dependency to a given interpreted programming language application.

As method 400 begins, as is shown in block 401, web start application 318 determines whether the interpreted programming language application exists on a remote computer, such as remote computer 108, 110, or 112. If at block 410 the interpreted programming language application is not present, then at block 402, web start application 318 downloads the interpreted programming language application on the remote computer. From block 402 or, if at block 410 the interpreted programming language application is present on the remote computer, then at block 403 the web start application 318 attempts to launch an interpreted programming language application on the remote computer. Generally, the launch of the main application involves the remote computer connecting to the server 104. This is accomplished for example over a typical network connection as described above. In an illustrative embodiment, Java Web Start attempts to launch a main Java application by connecting to server 104 from a remote computer.

As seen at block 404, an installer object is invoked by the remote computer. Installer object 322 is typically invoked by the main application 320 being started by WSA 318. Installer object 322 may also be invoked by WSA 318. The installer object can be invoked even if the filelist.txt and version.txt files are not present; In this case it will not install any files.

In an illustrative embodiment, the installer object is invoked by the Java application that is started by Java Web Start (JWS). JWS starts on the remote computer. Then JWS acquires all the jar files from the server needed to run the desired Java application on the remote computer. JWS then starts the desired Java application on the remote computer. JWS or the main Java application then invokes the installer object. As soon as JWS is running on the remote computer, it downloads all the files that it needs to download from the server. Typically, the files that JWS needs to download to start the Java application are dictated by the server.

In the present invention, all the jar files are already on the remote computer. So the installer object begins by trying to find the install.jar file in the list of downloaded files on the remote computer. If the installer object finds "install.jar" then it will go through its logic of extracting the JNI libraries from the install jar file and putting them in a designated JRE bin directory. The installer object will download JNI libraries from the server or search for the existing libraries on the remote computer and makes sure they are placed in the appropriate JRE bin directory. The installer then invokes the JNI library from the server and loads it onto the remote computer. This installer class object is invoked before the JNI code is invoked for use by the main Java application. The install class is packaged with the other jar files for the Java main application and can be invoked from within the main class of the application itself.

The remote computer uses Java Web Start in a Java Runtime Environment to invoke a Java installer object in a manner well known in the art. Java is an object oriented programming language and environment focusing on defining data as objects and the methods that may be applied to those objects. The Java installer object is a software component in accordance with the present invention which has been compiled to dynamically provide JNI libraries and their dependencies to the main Java application. The Java Installer object is able, for example, to determine the absence or presence of certain files, to determine the versions of these files that are on the remote computer, to determine the versions of the files it downloaded from the server and to overwrite certain files if the versions it downloaded are newer or the files are not present at all on the remote computer.

```
The installer object is invoked for example using
public static void main(String [ ] args) {
    Installer installer = new Installer( );
    Installer.install( );
    Run the application ...
}
```

As seen at block 405, the remote computer determines if "install.jar" is present on the remote computer. "Install.jar" (jar file) contains all the necessary files to run the main application, including the actual native code libraries as well as a file listing the filenames of the native code libraries. Another file containing a version number is also packaged in the same jar file. The installer object extracts the file containing the list of native code libraries. It goes through the list of the names and extracts each one of the files to a target bin directory. Thus, "Install.jar" contains the native code library and its dependencies. "Install.jar" further contains a file listing the filenames of the native code library and all dependent files. This file is named, for example "installist.txt" or "filelist.txt". Generally this list comprises the name of one file per line. "Install.jar" further contains a file with a version string. This file is named, for example "installver.txt" or "version.txt". The installer class is also packaged in the same jar file.

In an illustrative embodiment, "Install.jar" (jar file) contains all the necessary files to run the main Java application, including actual JNI libraries as well as a file listing the names of the JNI libraries. Another file containing a version number is also packaged in the same jar file. The installer object extracts the file containing the list of JNI libraries. It goes through the list of the names and extracts each one of the files to a designated JRE bin directory. Thus, "Install.jar" contains the JNI code and its dependencies. "Install.jar" further contains a list of JNI library files and all their dependencies. The installer object is also packaged in the same jar file.

If at block 405 "install.jar" is not present, all the necessary files are already available to the main application on the remote computer. The method proceeds to block 430 where the installer object has completed its task and from there to block 440 where the main application is now launched. This main application, which originally invoked the installer object, now goes on to perform its main task. This main application could perform any suitable function, several of which are known in the art, after the libraries have been appropriately adapted.

In an illustrative embodiment, this main application is a Java application and its main task is any suitable Java function as is known in the art.

If at block 405 "install.jar" is present then, as seen at block 406, the remote computer extracts "filelist.txt" from the jar file. The file "filelist.txt" is a listing of the filenames of one or more native code library files and their dependencies.

For example, "filelist.txt" contains a list of files such as:
  a.dll
  b.dll
  c.dll
wherein a.dll is the JNI library and b.dll and c.dll are its dependencies.

In an illustrative embodiment, "filelist.txt" lists JNI library files for a particular Java application as well as all the dependencies to these library files.

As seen at block 408, the remote computer extracts "version.txt" from the jar file. The file "version.txt" contains a single number, indicating the version of the files to be installed. The file "version.txt" is incremented every time a native code library is modified. Thus "version.txt" originally contains, for example, number 1.1. After the modification of a native code library, "version.txt" would then contain number 1.2. The version number in "version.txt" is incremented with any change to native code libraries, when the install.jar file is packaged again on the server. In an illustrative embodiment, the version number in "version.txt" is incremented whenever a change is made to a JNI library.

As seen at block 410, the remote computer determines if "version.txt" is present in a target directory of the run time environment where the interpreted programming language application will be run. In the illustrative embodiment, the target directory is a JRE bin directory, which is typically the location on the remote computer's filesystem where the JVM is installed. If at block 410 there is no "version.txt" present in the target directory, the required dynamically loaded native code libraries and their dependencies have not yet been installed on the remote computer. If this is the case, the method proceeds to block 420, which is described in detail below. If at block 4210 there is a "version.txt" present, the method may proceed to block 412.

As seen at block 412, the remote computer compares the version numbers from the file "version.txt" which was found at block 410 in the target bin directory with the file "version.txt" which was extracted at block 408. In one embodiment of the invention, this version number comparison is a string comparison of the two numbers contained in the two "version.txt" files.

As seen at block 414, it is determined whether the version number extracted at block 408 is greater than the number found at block 410. If at block 414 the version number extracted at block 408 is not greater than the number found at block 410, the method proceeds to block 430, where the installer object has finished.

If at block 414 the version number extracted at block 408 is indeed greater than the number found at block 410, the method proceeds to block 420, wherein all the appropriate files listed in "filelist.txt" are downloaded and extracted to the target directory. At this time, the method also comprises loading a file indicating the target directory, generally indicating the default path of the main application. In accordance with the present invention, this default path points to the native code library and any dependent libraries. In an illustrative embodiment, the first file listed in "filelist.txt" is extracted to the JRE bin directory. Furthermore, the default path of the main Java application indicates the JRE bin directory. In this manner, the JNI library and its dependencies listed in "filelist.txt" are moved into the appropriate path to be used by Java Web Start and thus the Java main application. That is, by writing the JNI libraries in the JRE's bin directory, the method places the JNI library in the "PATH" of the application that needs these libraries.

As seen at block 422, if there are older versions of the native code libraries present in the target directory, these files are overwritten. In an illustrative example, if older versions of JNI library files are present in the JRE bin directory, these files are overwritten. For example, if it is the first time the Java application has been run on the remote computer, every file listed in "filelist.txt" will be extracted. If it is a subsequent time, then only the older JNI libraries that have a newer version in the jar file will be overwritten.

As seen at block 423, it is determined if there is another (next) file in, "filelist.txt". If such a file is listed, it is usually on the next line of "filelist.txt" after the previous file. If at block 423 another file is listed, the method returns to 420. If at block 423 there are no more files listed, the method proceeds to 424.

As seen at block 424, once all the files in "filelist.txt" have been written to the target directory, the file "version.txt" in the target directory is overwritten with the latest "version.txt" from the jar file. In an illustrative embodiment, the "version.txt" in the JRE bin directory is overwritten with the latest "version.txt" file from the JAR file. Thus, the JRE bin directory will now have a "version.txt" indicating the latest version of files in its directory.

The method proceeds to block 430 where the installer object has completed its task.

The method then proceeds to block 440 where the main application is now fully launched and may run its task without interruption. In an illustrative embodiment, a Java application, either Java Web Start or another Java application, is launched. This main Java application, which originally invoked the installer object, now goes on to perform its main task. This main Java application could perform any suitable Java function, several of which are known in the art, after the libraries have been appropriately adapted.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device), or a propagation medium such as a carrier wave. Examples of a computer-readable medium include a semiconductor or solid state memory, magnetic tape, a removable computer diskette, a random access memory (RAM), a read-only memory (ROM), a rigid magnetic disk and an optical disk.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of providing a native code library from a server to an interpreted programming language application for execution on a remote computer, comprising:
    determining, by a web start application, whether the interpreted programming language application exists on the remote computer;
    responsive to determining that the interpreted programming language application fails to exist on the remote computer, downloading, by the web start application, the interpreted programming language application;
    invoking, by the web start application, an installer object from within a main class of the interpreted programming language application without invoking the main class of the interpreted programming language application;
    downloading and extracting, by the installer object, the file list on the server comprising at least one native-code-library-filename, wherein the native-code-library-filename indicates the native code library and the target directory on the remote computer and wherein the file list further comprises at least one additional library filename indicating at least one native code library dependency dependent on the native code library;
    extracting, by the installer object, a latest-version-file from the server, wherein the latest-version-file indicates a latest version number of a file list on the server;
    locating, by the installer object, a current-version-file in a target directory on the remote computer, wherein the current-version-file indicates a current version number of a file list on the remote computer;
    responsive to a failure to locate the current-version-file in the target directory on the remote computer, installing, by the installer object, the native code library indicated by the native-code-library-filename to the target directory;
    responsive to a failure to locate the current-version-file in the target directory on the remote computer, installing, by the installer object, the at least one native code library dependency indicated by the additional library filename to the target directory on the remote computer; and
    invoking, by the web start application, the main class of the interpreted programming language application on the remote computer, wherein the interpreted programming language application uses the native code library and the at least one native code library dependency.

2. The method of claim 1, further comprising:
    responsive to an existence of the current version file in the target directory on the remote computer, comparing, by the installer object, the latest version number of the file list on the server to the current version number of the file list on the remote computer.

3. The method of claim 2, further comprising:
    overwriting, by the installer object, the current-version-file in the target directory with the latest-version-file.

4. The method of claim 2, further comprising:
    overwriting, by the installer object, at least one older library file on the remote computer with the native code library and the at least one native code library dependency.

5. A system of providing a native code library from a server to an interpreted programming language application for execution on a remote computer, comprising:
    a processor; and
    a memory coupled to the processor, wherein the memory comprises instructions which, when executed by the processor, cause the processor to:
    determine, using a web start application, whether the interpreted programming language application exists on the remote computer;
    responsive to determining that the interpreted programming language application fails to exist on the remote computer, download, using the web start application, the interpreted programming language application;
    invoke, using the web start application, an installer object from within a main class of the interpreted programming language application on the remote computer without invoking the main class of the interpreted programming language application;

download and extract the file list on the server comprising at least one native-code-library-filename using the installer object, wherein the native-code-library-filename indicates the native code library and the target directory on the remote computer and wherein the file list further comprises at least one additional library filename indicating at least one native code library dependency dependent on the native code library;

extract a latest-version-file from the server using the installer object, wherein the latest-version-file indicates a latest version number of a file list on the server;

locating a current-version-file in a target directory on the remote computer using the installer object, wherein the current-version-file indicates a current version number of a file list on the remote computer;

responsive to a failure to locate the current-version-file in the target directory on the remote computer, install the native code library indicated by the native-code-library-filename to the target directory using the installer object;

responsive to a failure to locate the current-version-file in the target directory on the remote computer, install the at least one native code library dependency indicated by the additional library filename to the target directory on the remote computer using the installer object; and invoke, using the web start application, the main class of the interpreted programming language application on the remote computer, wherein the interpreted programming language application uses the native code library and the at least one native code library dependency.

6. The system of claim 5, wherein the instructions further cause the processor to:

responsive to an existence of the current version file in the target directory on the remote computer, compare the latest version number of the file list on the server to the current version number of the file list on the remote computer using the installer object.

7. The system of claim 6, wherein the instructions further cause the processor to:

overwrite the current-version-file in the target directory with the latest-version-file using the installer object.

8. The system of claim 6, wherein the instructions further cause the processor to:

overwrite at least one older library file on the remote computer with the native code library and the at least one native code library dependency using the installer object.

9. A computer program product comprising a computer readable storage medium having a computer readable program stored therein, wherein the computer readable program, when executed on a computing device, causes the computing device to:

determine, using a web start application, whether an interpreted programming language application exists on the computing device;

responsive to determining that the interpreted programming language application fails to exist on the computing device, download, using the web start application, the interpreted programming language application;

invoke an installer object, using the web start application, from within a main class of the interpreted programming language application on the computing device without invoking the main class of the interpreted programming language application;

download and extract the file list on the server comprising at least one native-code-library-filename using the installer object, wherein the native-code-library-filename indicates the native code library and the target directory on the computing device and wherein the file list further comprises at least one additional library filename indicating at least one native code library dependency dependent on the native code library;

extract a latest-version-file from a server using the installer object, wherein the latest-version-file indicates a latest version number of a file list on the server;

locating a current-version-file in a target directory on the computing device using the installer object, wherein the current-version-file indicates a current version number of a file list on the computing device;

responsive to a failure to locate the current-version-file in the target directory on the computing device, install the native code library indicated by the native-code-library-filename to the target directory using the installer object;

responsive to a failure to locate the current-version-file in the target directory on the computing device, install the at least one native code library dependency indicated by the additional library filename to the target directory on the computing device using the installer object; and invoke the main class of the interpreted programming language application on the computing device, wherein the interpreted programming language application uses the native code library and the at least one native code library dependency.

10. The computer program product of claim 9, wherein the computer readable program further causes the computing device to:

responsive to an existence of the current version file in the target directory on the computing device, compare the latest version number of the file list on the server to the current version number of the file list on the computing device using the installer object.

11. The computer program product of claim 10, wherein the computer readable program further causes the computing device to:

overwrite the current-version-file in the target directory with the latest-version-file using the installer object.

12. The computer program product of claim 10, wherein the computer readable program further causes the computing device to:

overwrite at least one older library file on the computing device with the native code library and the at least one native code library dependency using the installer object.

* * * * *